Nov. 19, 1957 R. J. BRITTAIN, JR 2,813,764
JOURNAL BOX
Filed June 28, 1954

INVENTOR
RICHARD J. BRITTAIN JR.
BY Edward H. Goodrich
HIS ATTORNEY

INVENTOR
RICHARD J. BRITTAIN JR.
BY Edward H. Goodrich.
HIS ATTORNEY.

United States Patent Office 2,813,764
Patented Nov. 19, 1957

2,813,764

JOURNAL BOX

Richard J. Brittain, Jr., Berkeley Heights, N. J., assignor to General Motors Corporation, Detroit, Mich., a corporation of Delaware Application June 28, 1954, Serial No. 439,749

10 Claims. (Cl. 308—180)

This invention relates to journal boxes and particularly to a cushioned arrangement for yieldably receiving the end thrust of an axle in a railway journal box.

An object of my invention is to provide an improved construction for resiliently cushioning and limiting the end thrust of an axle in a railway journal box. Another object is to provide an improved antifriction arrangement for engaging and yieldably limiting the end thrust of an axle. Another object is to provide an improved antifriction thrust assembly having simply constructed parts which may be easily installed in and demounted from a journal box.

To these ends and also to improve generally upon devices of this character, the invention consists in the various matters hereinafter described and claimed. In its broader aspects, the invention is not necessarily limited to the specific structures selected for illustrative purposes in the accompanying drawings wherein:

Figures 1, 2, 3, 4, 5:
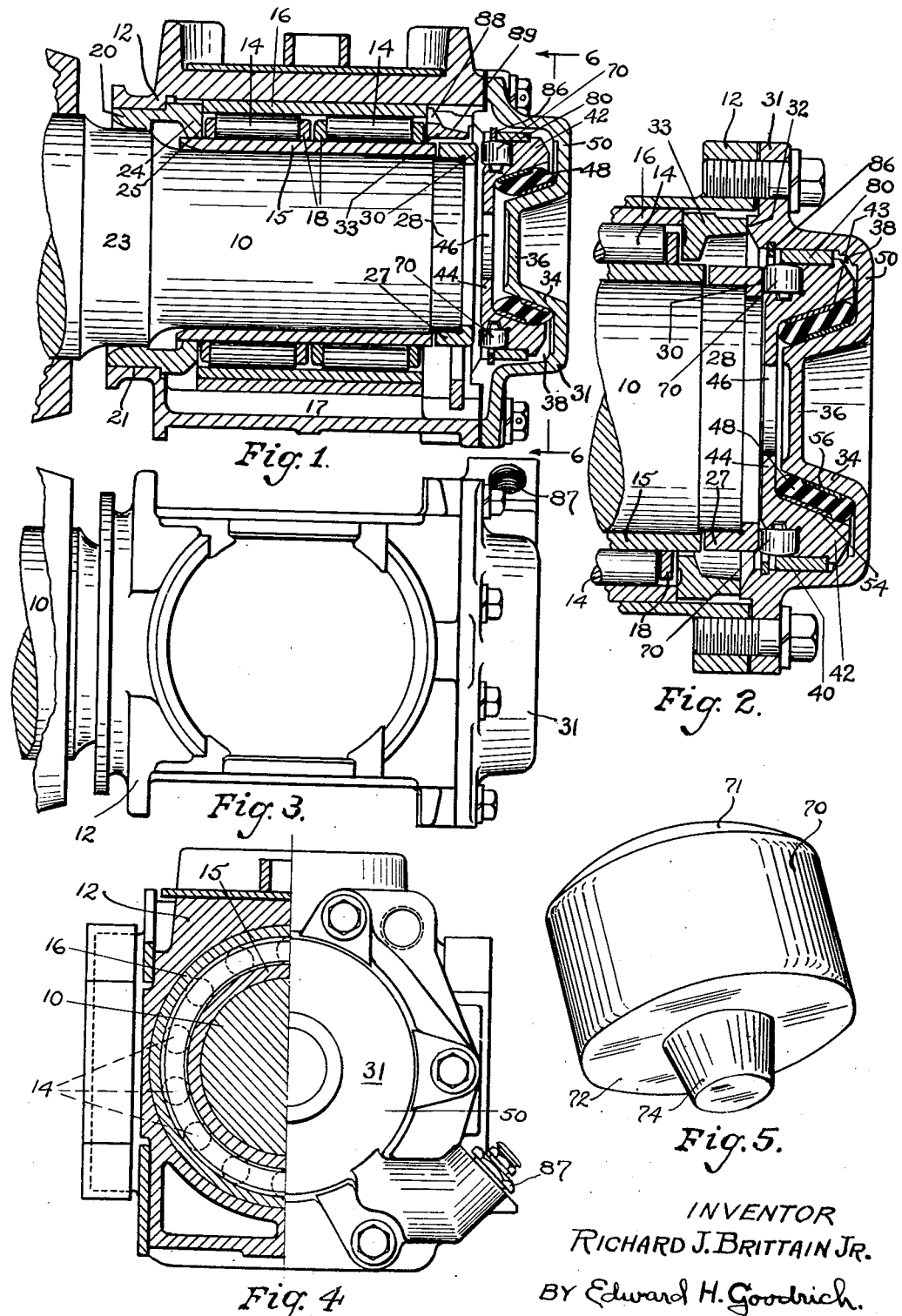
Figure 1 is a vertical sectional view of my journal box.
Figure 2 is a fragmentary central horizontal section of the forward end of the journal box.
Figure 3 is a plan view of the journal box.
Figure 4 is a fragmentary front end view of the journal box partly broken away to show interior parts in vertical section.
Figure 5 is a perspective view of one of the end thrust rollers.
Figure 6:
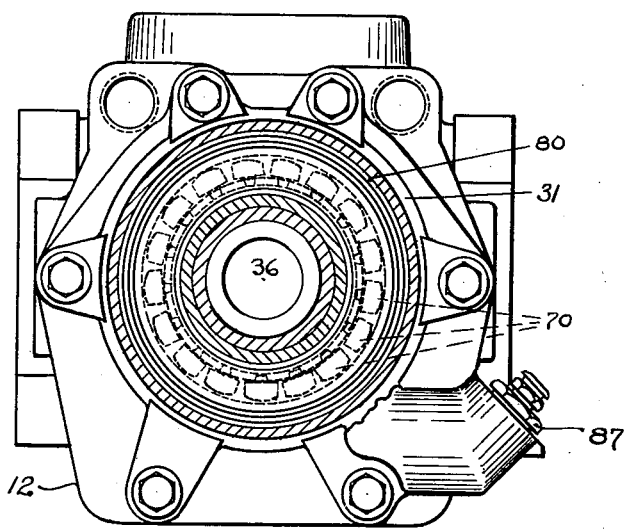
Figure 6 is an end view broken away along the line 6—6 of Figure 1.
Figure 7:
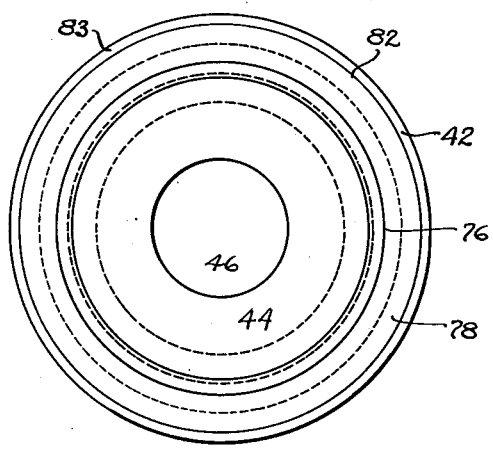
Figure 7 is an end view of the outer ring of the thrust bearing.
Figure 8:
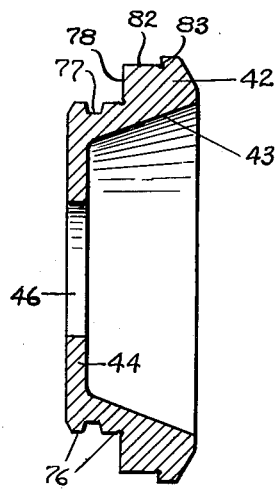
Figure 8 is a diametrical section through the outer ring of the thrust bearing.

An axle 10 is supported in a journal box 12 for rotation and for endwise movement by two rows of cylindrical bearing rollers 14 which roll upon a hardened inner raceway sleeve 15 pressed over a reduced end of the axle and which also roll against the cylindrical inner face of a hardened outer raceway sleeve 16 pressed into the journal box 12. A well 17 in the bottom of the box receives lubricant which is accessible to the rollers 14. The rollers of each row are circumferentially spaced by a rotatable cage 18. A sealing ring 20 pressed into a bore 21 in the rearward end of the box 12 closely surrounds a cylindrical portion 23 of the axle to prevent lubricant leakage from the rear of the journal box, and a forward flanged end 24 of this sealing ring closely surrounds the inner raceway sleeve 15 and is provided with a front end face 25 which abuts against the outer race ring sleeve 16 and also limits the rearward axial movement of the rotatable cage and roller assemblies. A hardened inner race ring 27 is pressed over a reduced end portion 28 of the axle and has an end flange abutting the end of the axle 10 and is provided with a flat end face 30.

An end cap 31 is demountably secured as by screws to the front of the journal box 12 and has an inwardly projecting annular portion 32. A spacer ring 33, surrounding the raceway sleeve 15 and the race ring 27 in spaced relation, abuts against the annular portion 32 and against the outer end of the raceway sleeve 16 to aid in securing the raceway sleeve 16 in axial position. The end cap 31 has a conical wall 34 terminating in an end wall 36, this conical wall 34 being surrounded by an annular end cap recess 38 having a parti-cylindrical wall 40. An outer bearing race ring 42 has a conical inner wall 43 in surrounding relation to the end cap conical wall 34, the conical wall 43 terminating in an end wall 44 provided with a through bore 46. This bore 46 prevents any pocketing of lubricant or gases between the walls 44 and 36. An annular generally conical cushion 48 is fitted in the space between and seats in conforming relation against the opposed conical walls 34 and 43. This cushion may be composed of various inherently resilient rubber-like materials which will not deteriorate in the presence of heat, light or lubricants. One satisfactory material for this cushion comprises a resilient vulcanized synthetic rubber containing a polymerization product of butadiene and acrylic nitrile. This cushion has rounded end nose portions engageable with an annular wall 50 at the forward end of the end cap 31 and at its other end engageable with the wall 44 of the race ring 42. Externally merging with the outer periphery of the cushion 48 is a conical metal reinforcing sleeve 54 preferably bonded to the resilient cushion material, and a similar but smaller metal sleeve 56 is bonded to the inner periphery of the cushion 48. These metal sleeves 54 and 56 are axially offset with respect to each other and each have their ends lying in spaced relation to the adjacent ends of the cushion 48.

Figure 9:
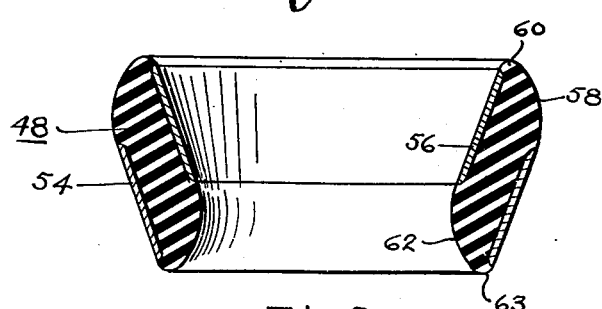
Figure 9 is an enlarged cross section of the shock absorbing cushion.

As best illustrated in Figure 9, the outer reinforcing sleeve 54 is in greater end spaced relation to the larger end of the cushion 48 than the spaced relation of this sleeve to the smaller end of the cushion. Similarly, the spaced relation of the inner sleeve is greater at the end of the cushion which has the smaller diameter. The larger end of the cushion 48 terminates in a rounded nose wherein a radial portion 58 blending with the outer periphery of the cushion merges with a portion 60 of shorter radius which blends with the inner periphery of the cushion. Similarly, at the smaller end of the cushion 48, a larger radial portion 62 blending with the inner periphery of the cushion merges with a portion 63 of much shorter radius which blends with the outer periphery of the cushion.

A series of circumferentially spaced rollers 70 are each provided with a rounded outer end 71 and a flat inner end 72 from which extends a frusto-conical axial projection 74. These rollers are circumferentially located about a cylindrical face 76 on the inner end of the member 42 and an annular grooved portion 77 cut in this face 76 loosely receives the tapered end roller projections 74, the side walls of the groove 77 being tapered correspondingly to the taper of the roller projections 74. An annular flat end wall 78 on the race ring 42 is engageable with the cylindrical peripheries of the rollers 70, these roller peripheries being also engageable with the flat annular end face of the hardened race member 27. A retaining ring 80 is pressed over a cylindrical portion 82 and against an annular shoulder 83 on the member 42. The inner cylindrical wall of this ring 80 loosely overlies the rounded ends of the rollers 70, the end of this ring preferably extending only slightly beyond the axes of the rollers as shown in Figure 2. A snap ring 86, demountably received in an end cap groove cut in the end wall 40, holds the parts within the end cap in assembled relation with the end cap. As best shown in Figure 1, the snap ring 86 is so positioned that it will be engaged by the retaining ring 80 and hold the cushion 48 under slight initial preload when the rollers 70 are in spaced relation to the end face 30 of the race ring 27. The inner diameter of the snap ring 86 is sufficiently large so that it will not impede the rotation of the rollers 70.

In assembly, the rollers 70 are located in circumferential arrangement against the wall 78 with their ends 74 loosely received in the groove 77 after which the retaining ring 80 is pressed into position against the shoulder 83 thereby holding the rollers in freely rolling but loosely assembled relation with the race ring 42. The race ring assembly of the thrust bearing is thereafter fitted over the cushion 48 which has been previously seated over the conical wall 34, the thrust bearing assembly being piloted at this time by the slidable interfit of the retaining ring 80 against the end cap wall 40. With the parts thus assembled and under slight endwise deformation of the resilient cushion 48, the snap ring 86 is mounted in its groove to hold the thrust bearing and the cushion 48 in unit-handling assembly with the end cap 31. Lubricant may be entered through a suitable filler cap 87 into the well 17 in the bottom of the box 12 from whence it will have access to the rollers 14. As shown in Figure 1, the spacer ring 33 is provided with a through opening 88 and a tapering nose 89 so that lubricant picked up by the forward set of rollers 14 will flow through this opening 88 and be directed onto the rollers 70.

In operation, the rollers 70 normally lie in spaced relation to the flat annular end face of the thrust ring 27. However, when a car equipped with this journal box negotiates rough portions of track or curves, the axle 10 may slide endwise within the sets of rollers 14 causing the thrust ring 27 to rotatably engage the rollers 70 which in turn roll upon the flat annular shoulder 78 of the race ring 42. At this time, the reteaining ring 80 will axially slide against the parti-cylindrical wall 40 and the conical cushion 48 will be subjected under influence of the relative axial movement of the race ring 42 and the end cap 31 to a resilient shear deformation which yieldably resists the end thrust of the axle with a rapidly increasing pressure until this conical cushion 48 substantially fills the conical chamber in which it is received (Figure 2), the end thrust of the axle being finally limited by the end engagement of the inner race ring 42 against the end cap wall 50. This improved construction eliminates the objectionable frictional drag and consequent scoring of an end thrust block against the end of an axle as has been common in prior constructions. With this arrangement, the end thrust is antifrictionally received and a very uniform cushioning of the end thrust of the axle is effected. The engagement of the race ring 42 against the cushion 48 and the slidable engagement of the retaining ring 80 against the end cap wall 40 will normally restrain the race ring 42 from rotation, all rotation of the end of the axle being received by the rollers 70. However, if desired, the race member 42 may be slidably keyed against rotation with respect to the end cap 31.

I claim:

1. In a journal box having an axle journalled for rotation and axially shiftable therein, an end cap removably secured to the box, an inward conical projection on the end cap having its smaller end directed toward the box, a resilient frusto conical annular cushion of rubber-like material seated over the conical wall, an antifriction bearing member having an internal conical wall seated on the resilient cushion, rolling elements carried by the antifriction bearing member and arranged to receive the end thrust of the axle, and a retaining ring mounted on the antifriction bearing member and engaging the outer ends of the rolling elements for holding the rolling elements in unit-handling relation therewith.

2. In a journal box having an axle journalled for rotation and axially shiftable therein, an end cap removably secured to the box and having an annular recess, a conical end cap wall extending into the recess and having its smaller end directed towards the box, a conical cushion of inherently resilient deformable material seated over the conical end cap wall, a bearing race ring seated over and supported by the resilient cushion, a plurality of rolling elements mounted on the race ring and engaging a raceway on said race ring, a retaining ring for the rolling elements fitted over the race ring and slidably received within the end cap, and a thrust ring secured to the axle and engageable with said rolling elements.

3. In a journal box having an axle journalled for rotation and shiftable endwise therein, an end cap demountably secured to one end of the box, a conical end cap projection extending towards and spaced from the axle, a conical cushion of inherently resilient rubber-like material seated on the end cap projection, a race ring having a conical inner portion seated on said conical cushion, said race ring having an annular raceway, an annular shoulder on the race ring terminating at the raceway, circumferentially arranged rollers engaging the raceway and having end portions engageable with said annular shoulder, a retaining ring fitted over the race ring and overlying the other ends of the rollers to axially locate the rollers, and a race ring fitted over the end of the axle and having an end face provided with a raceway engageable with said rollers.

4. In a journal box having an axle journalled for rotation and shiftable endwise therein, an end cap demountably secured to and closing an end of the box, a conical end cap projection extending towards the axle, a conical cushion of inherently resilient rubber-like material seated on the end cap projection, a race ring having a conical inner portion fitted over the conical cushion, said race ring having a substantially flat annular raceway and having a substantially cylindrical face adjacent the raceway, circumferentially arranged rollers having surfaces of revolution engaging the raceway and having end portions engageable with said cylindrical face, a retaining ring peripherally embracing the race ring and partially overlying the other ends of the rollers to maintain them in operative positions, said retaining ring peripherally fitting within the end cap for slidable endwise movment, and a race ring fitted over the end of the axle and having a flat end face for engagement with said roller surfaces of revolution.

5. In a journal box having an axle journalled for rotation and axially shiftable therein, an end cap demountably secured to the box and having an annular recess surrounding a conical end cap wall, a conical inherently resilient cushion fitted over the conical wall, a bearing race ring having a conical wall seated over the cushion and having a raceway, a circumferential series of rollers rotatably engageable with the raceway, cooperating means on the rollers and on the race ring for locating the rollers relative to the raceway, rounded outer ends on the rolling elements, a retaining ring mounted on the race ring and overlying the rounded ends of the rolling elements, a snap ring demountably received in the end cap and engageable with the retaining ring to deform the cushion under a predetermined preload, said snap ring demountably securing the race ring rollers and cushion within the annular recess, and a thrust ring secured to and overlying the end of the axle and engageable with the rollers.

6. In a journal box having an axle journalled for rotation and axially shiftable therein, an end cap demountably secured to the box and having an annular recess surrounding a conical end cap wall and opening into the box, a generally conical annular cushion of inherently resilient rubber-like material seated over the end cap wall, a bearing race ring having a conical wall seated upon the periphery of the cushion and having a flat annular raceway and a generally cylindrical surface, rolling elements having cylindrical portions engaging the raceway and having ends engageable with said cylindrical surface, projecting portions on the rollers interfitting with the race ring to locate the rollers in raceway engagement, rounded ends on the rolling elements, a retaining ring mounted over the race ring and partially overlying the rounded ends of the rolling elements, a snap ring demountably received in the end cap and engageable with the retaining ring to deform the resilient cushion under a predetermined preload, and to secure the rollers, race ring and cushion in unit-handling assembled relation with the end cap and a thrust ring pressed over the end of the axle and having an end wall engageable with the cylindrical portions of the rolling elements.

7. In a journal box having an axle journalled for rotation and axially shiftable therein, an end cap removably secured to the box and having an annular recess, a conical end cap wall extending into the recess and having its smaller end towards the box, a conical cushion of resiliently deformable material seated over the conical wall, a bearing race ring fitted over the cushion and having an annular raceway and an annular groove, a circumferential series of rolling elements engaging the raceway and having axial projections extending into said groove, and a thrust ring fitted over the end of the axle and engageable with said rolling elements.

8. In a journal box having an axle journalled for rotation and axially shiftable therein, an end cap removably secured to the box and having an annular recess between an annular end cap outer wall and an inner conical end cap wall with its smaller diameter towards the box, a conical annular cushion of resilient material seated over the conical end cap wall, a bearing race ring mounted over the cushion and having a raceway and an annular groove, a circumferential series of rolling elements engaging the raceway and having projections extending into the groove, a retaining ring fitted over the bearing race ring and holding the rolling elements assembled therewith, and a thrust ring secured to the end of the axle and engageable with the rolling elements.

9. In a journal box having an axle journalled for rotation and axially shiftable therein, an end cap removably secured to the box and having an annular recess between an annular outer end cap wall and an inner conical end cap wall, a conical annular cushion of resilient rubber-like material demountably seated over the conical end cap wall, a bearing race ring having a conical wall seated over the cushion, the race ring having an annular raceway and an annular groove, rolling elements engaging the raceway and having projections received in said groove, a retaining ring fitted over the race ring and securing the rolling elements in unit-handling assembly with the race ring, the retaining ring slidably engaging the outer end cap wall, a detachable member on the end cap securing the race ring and cushion in unit handling relation with the end cap, and a thrust ring on the axle engageable with the rolling elements.

10. In a journal box having an axle journalled for rotation and axially shiftable therein, an end cap demountably secured to the box and having an annular recess surrounding a conical end cap wall, a conical inherently resilient cushion fitted over the conical wall, a bearing race ring having a conical wall seated over the periphery of the cushion and having a raceway and an annular groove, rolling elements engaging the raceway, rolling element projections received in the groove, rounded ends on the rolling elements, a retaining ring mounted on the race ring and overlying the rounded ends of the rolling elements, a snap ring removably received in the end cap and demountably securing the race ring and rollers and cushion in the annular recess, and a thrust ring on the axle engageable with the rolling elements.

References Cited in the file of this patent

UNITED STATES PATENTS

| | | |
|---|---|---|
| 402,987 | Sharpneck | May 7, 1889 |
| 402,988 | Sharpneck | May 7, 1889 |
| 1,490,804 | Dessauer | Apr. 15, 1924 |
| 2,094,968 | Searles | Oct. 5, 1937 |
| 2,155,657 | Hellyar | Apr. 25, 1939 |
| 2,643,163 | Brittain | June 23, 1953 |